July 16, 1963 A. J. WASLEY 3,097,896
BEARING SEAL
Filed June 10, 1959
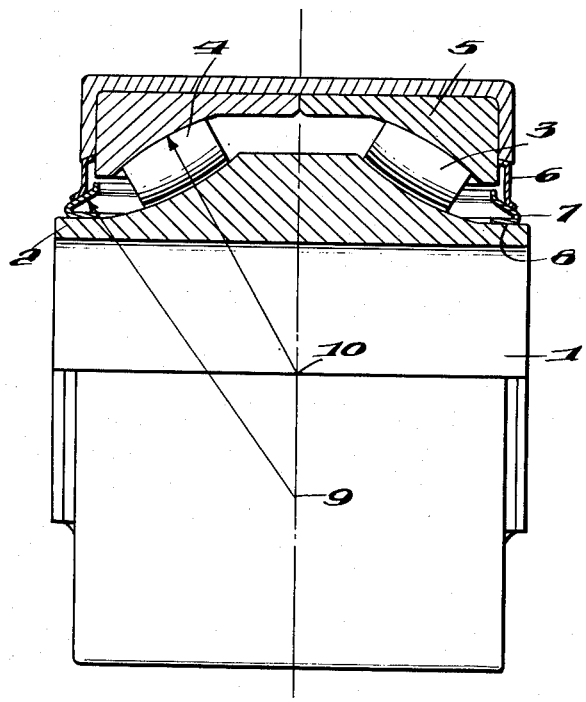
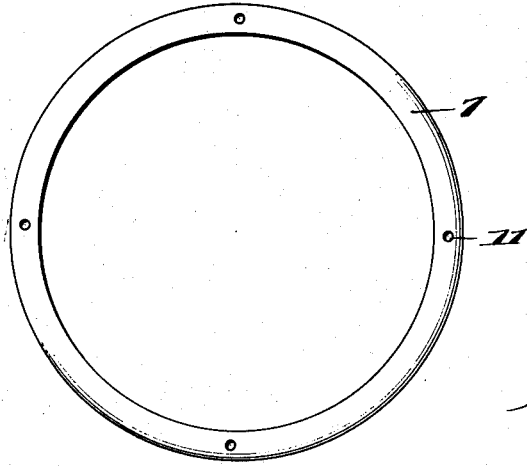
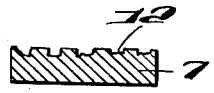
INVENTOR
ARTHUR JUSTIN WASLEY,
BY Larson and Taylor
ATTORNEYS 3,097,896
BEARING SEAL
Arthur Justin Wasley, Bristol, Conn., assignor to Wasley Products, Inc., Plainville, Conn., a corporation of Connecticut
Filed June 10, 1959, Ser. No. 819,491
1 Claim. (Cl. 308—187.2)

This invention relates to a bearing seal and more specifically to a seal for roller or needle bearings in which the seal will be maintained despite axial movement of the rotating shaft with respect to the outer bearing race.

Heretofore many bearing seal designs have been proposed in which a resilient element is fastened to the outer bearing race and the inner periphery thereof wipes against a flange or shoulder on the inner bearing race. This type of bearing seal performs effectively provided the outer bearing race maintains accurate alignment with the rotating shaft. If misalignment occurs the seal between the periphery of the resilient element and the inner bearing race is lost permitting the ingress of dirt to the bearings. Additionally, such seals do not provide means for lubricating the frictional engagement between the resilient element and the inner race, and thus the resilient element wears away more quickly than it otherwise would. It is also important to provide a means for permitting the pressure within the bearing to equalize with atmospheric pressure after the bearing has heated up. Thus, there were many problems attendant with prior art bearing seals and which rendered such seals relatively unsuitable for use with roller and needle bearings which provide for angular movement of the shaft.

The presently disclosed bearing seal incorporates means whereby a sealing action is maintained between the resilient element and the inner race despite misalignment of the rotating shaft with respect to the outer race. Additionally, the resilient element seals against a channel member secured to the inner bearing race and the engaging face of this channel member is finished in such a manner that it is provided with small craters or depressions which form areas for retaining lubrication thus reducing the friction between this member and the resilient element. The channel member has vent means therein so that the pressure within the seal is maintained the same as the pressure outside the seal irrespective of the temperature of the bearing. This prevents the resilient element from flapping against the retaining ring to make pressure adjustment.

An object of the present invention is to provide a bearing seal which may be used with roller or needle bearings and which will maintain a seal despite misalignment of the shaft with the outer bearing race.

Another object of the present invention is to provide means for effectively lubricating the area of engagement of the inner periphery of the resilient sealing element and the inner bearing race. Still another object is to incorporate vent means in a bearing seal so that pressure adjustments may be effected without losing the seal between the resilient element and the inner bearing race.

Other objects and many of the attendant advantages of the present invention will become apparent upon consideration of the following detailed specification in connection with the accompanying drawing wherein:

FIG. 1 is a cross sectional view of a roller bearing having a seal according to the present invention, FIG. 2 is a plan view of the retaining element fitted over the inner bearing race and FIG. 3 is an enlarged cross sectional view of the surface finish on the retaining element shown in FIG. 2.

Referring now more specifically to the drawing wherein like numerals indicate like parts throughout the several views, there is shown at 1 in FIG. 1 a shaft upon which is press fitted an inner bearing race 2. Roller bearings 3 and 4 are disposed between the inner bearing race 2 and an outer bearing race 5.

The means for sealing the bearings from the ingress of dirt and the like comprises a resilient ring shaped element 6 which is mounted on the outer bearing race in any known manner. This resilient element may be provided with metallic reinforcement in a manner well known in the art, and is so designed that the inner periphery thereof forms a wiping lip which maintains a seal between the inner and outer races. The resilient element engages a channel shaped element 7 which is provided with an inner face which engages by a press fit with the inner race. The outer face of the channel member forms a curved surface with point 9 as a center for the radius of curvature.

The center of curvature of the outer race is point 10 and as this is reasonably near the center of curvature of the outer face of the channel member, a sealing action is maintained despite angular movement of the shaft with respect to the outer race.

The channel member 7 is provided with vent apertures 11 such as shown in FIG. 2, and these vent holes are located so as to be disposed outside of the point of engagement of the resilient element with the channel member. In use the channel member is packed with grease and the vent openings form a convenient means to lubricate the bearing. It is also apparent that the vent means provides for maintaining a pressure equilibrium within and outside of the bearing even during excessive heating of the bearing.

The surface finish of the portion of element 7 which engages the resilient member 6 forms an important part of the invention. All integral bearing seals used heretofore have had metal surfaces prepared by machining and the like which have directional surface finish asperities. It is also true that rolling or grinding produces a directional finish. The difficulty is that directional asperities cut the seal or at high shaft speed cause seal flutter as the seal crosses the furrows created by the tool or grinding wheel generated during processing. According to the present invention a cratered surface is formed by ball burnishing or grit blasting. These craters are greater in width than in depth and have no sharp asperities. Generally these craters are of the order of twenty to twenty five thousandths of an inch in diameter and .0005 in depth. These small craters may be filled with a lubrication film and thus reduce the friction between the channel member and the wiping lip. Thus, it can be seen that ball burnishing the surface of the channel member serves two purposes, namely, reducing sharp asperities to prevent damage to the seal, and providing craters for the deposit of a lubrication film. The vent holes 11 in the channel member 7 also serve to bleed out lubrication to maintain the oil film on the external surface of the channel member. The surface of the member 7 is shown in FIG. 3 in enlarged cross section, and it can be seen that there are provided craters 12 which perform the functions outlined above.

Obviously many modifications and variations of the present invention are possible in light of the above teachings.

What is claimed as new and desired to be secured by Letters Patent is:

A bearing for a shaft comprising an inner race and an outer race, bearings disposed between said inner and outer races, said bearings having the longitudinal axes thereof angularly disposed with respect to the axis of rotation of the shaft so that the shaft may be angularly displaced with respect to the outer race, a V-shaped channel member mounted on the inner race, a flexible seal mounted on the outer race, said flexible seal having a lip engageable with a face of said channel member, said face of the channel member being arcuate to maintain the lip in engagement therewith when the shaft shifts angularly, microscopic craters on said face of the channel member and lubricant within the craters to provide a lubrication film covering the entire face of the channel member, vent holes within said face of the channel member, said vent holes being disposed outside the area of contact of the channel member with the flexible seal.

References Cited in the file of this patent

UNITED STATES PATENTS

| | | |
|---|---|---|
| 2,248,530 | Granger et al. | July 8, 1941 |
| 2,266,377 | Neely et al. | Dec. 16, 1941 |
| 2,619,369 | Williams | Nov. 25, 1952 |
| 2,884,285 | King | Apr. 28, 1959 |

FOREIGN PATENTS

| | | |
|---|---|---|
| 47,555 | Sweden | Oct. 5, 1918 |
| 675,386 | Germany | May 8, 1939 |
| 1,020,499 | Germany | Dec. 5, 1957 |
| 153,472 | Australia | Sept. 30, 1953 |